Figure 1:
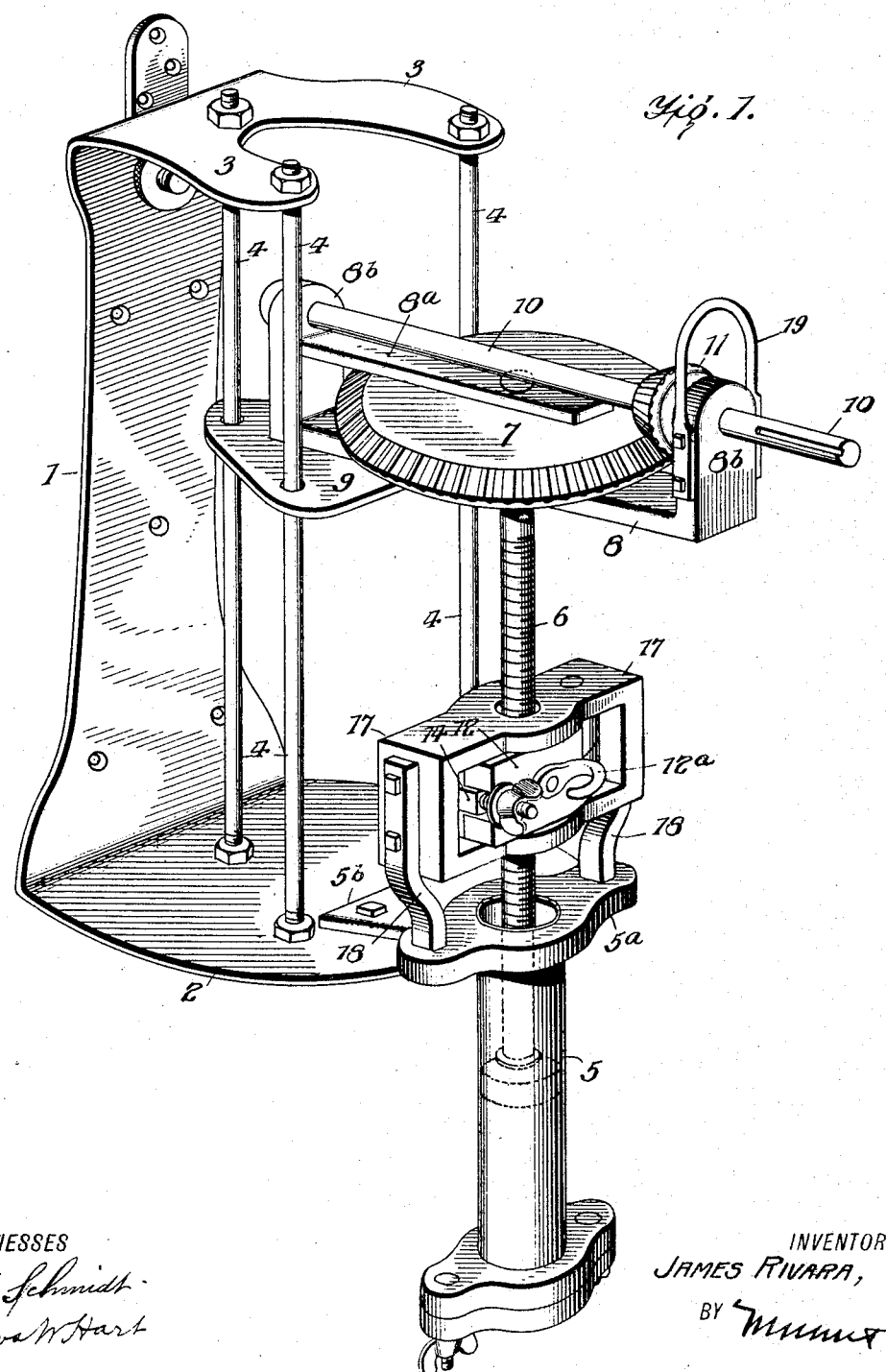

J. RIVARA.
MACHINE FOR MAKING MACARONI AND THE LIKE.
APPLICATION FILED NOV. 20, 1908.

928,796.  Patented July 20, 1909.
3 SHEETS—SHEET 1.

WITNESSES
J. H. Schmidt
Anva W Hart

INVENTOR
JAMES RIVARA,
BY Munn & Co.
ATTORNEYS

J. RIVARA.
MACHINE FOR MAKING MACARONI AND THE LIKE.
APPLICATION FILED NOV. 20, 1908.
928,796.
Patented July 20, 1909.
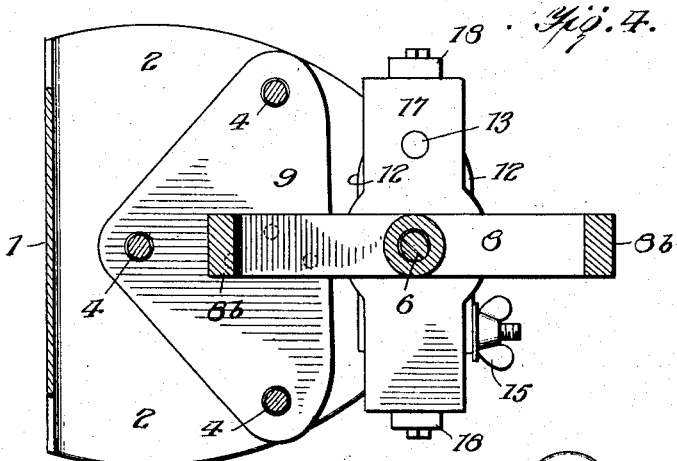
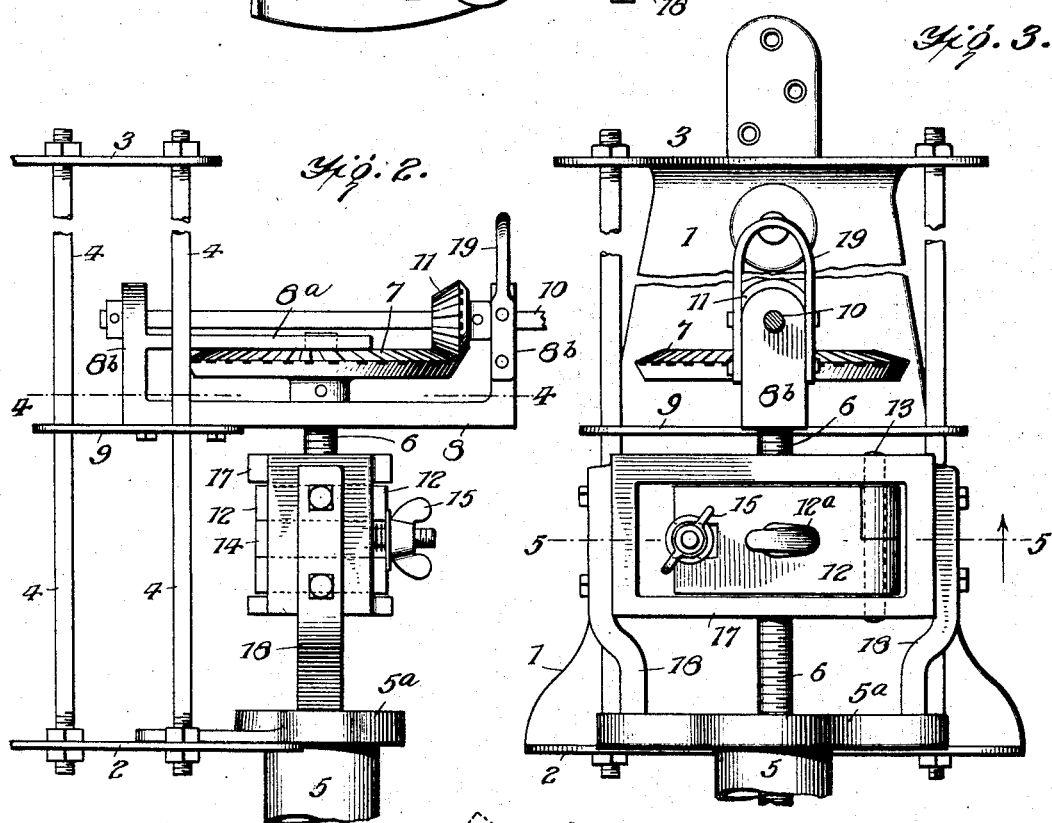
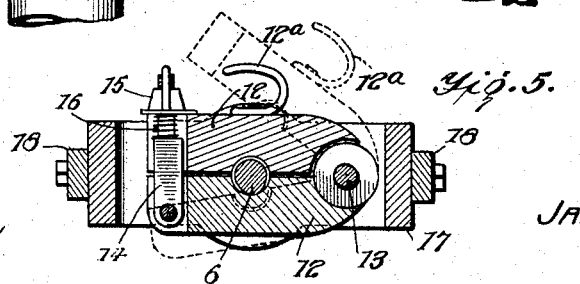
WITNESSES
J. H. Schmidt
Amos W. Hart
INVENTOR
JAMES RIVARA,
BY 
ATTORNEYS J. RIVARA.
MACHINE FOR MAKING MACARONI AND THE LIKE.
APPLICATION FILED NOV. 20, 1908.
928,796.
Patented July 20, 1909.
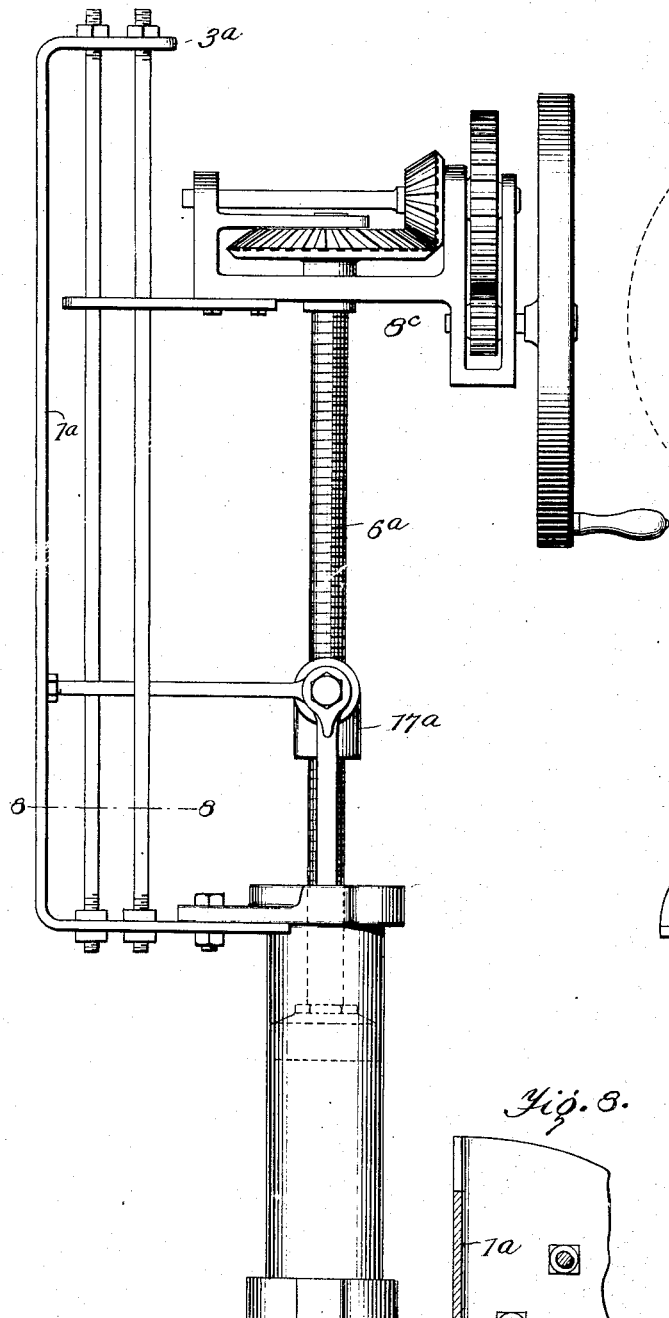
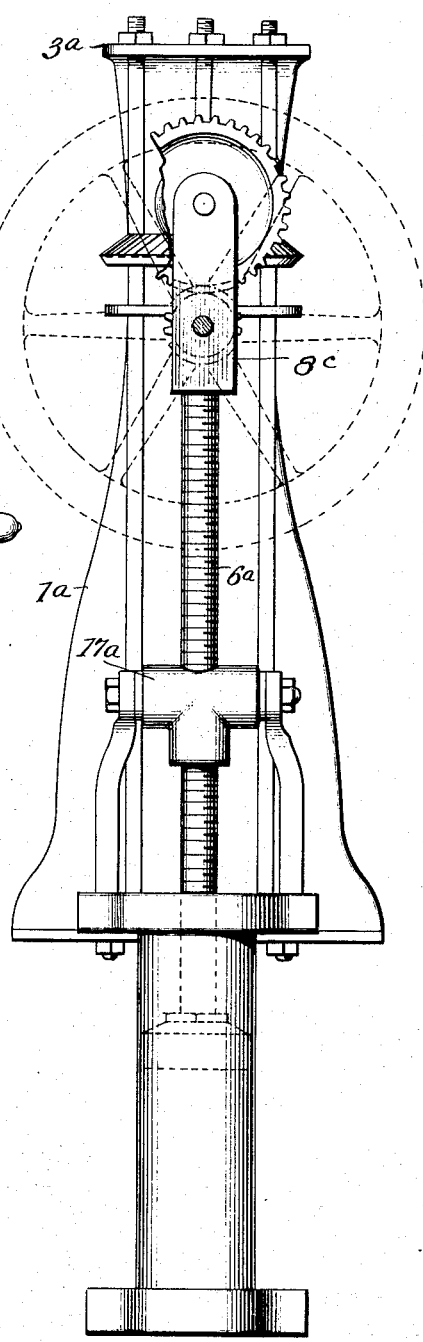
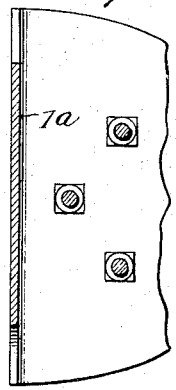
WITNESSES
INVENTOR
JAMES RIVARA,
BY Munn & Co.
ATTORNEYS

UNITED STATES PATENT OFFICE.

JAMES RIVARA, OF NATCHEZ, MISSISSIPPI.

MACHINE FOR MAKING MACARONI AND THE LIKE.

No. 928,796.  Specification of Letters Patent.  Patented July 20, 1909.

Application filed November 20, 1908. Serial No. 463,557.

*To all whom it may concern:*

Be it known that I, JAMES RIVARA, a citizen of the United States, residing at Natchez, Adams county, State of Mississippi, have invented an Improvement in Machines for Making Macaroni and the Like, of which the following is a specification.

While my improved machine is particularly adapted and intended for use in making macaroni, it is also adapted for pastry, noodles, and the like, and for pressing juice from fruit for making wine, jellies, etc.

The object of the invention is to simplify the construction of machines of this class and to adapt the screw, which operates the plunger or piston, to be quickly withdrawn from the cylinder in which dough or other material is pressed to produce macaroni or other product.

The details of construction, combination, and operation of parts are as hereinafter described, and illustrated in the accompanying drawings in which—

Figure 1 is a perspective view of the preferred form of my invention. Fig. 2 is a side elevation of the main portion of the machine. Fig. 3 is a front elevation of the same. Fig. 4 is a horizontal section on the line 4—4 of Fig. 2. Fig. 5 is a horizontal section on the line 5—5 of Fig. 3. Fig. 6 is a side elevation of a modified form of my invention. Fig. 7 is a face or front view of the same. Fig. 8 is a horizontal section on the line 8—8 of Fig. 6.

I will first describe the invention as illustrated in Figs. 1-5.

1 indicates the vertical portion of a bracket which is provided with parallel flanges 2 and 3 extending forward horizontally and which are rigidly connected and braced by means of three rods 4 arranged in triangular relation as indicated in Figs. 1 and 4. The body of the bracket 1, 2, 3, is bored with holes to receive screws or bolts for fastening the same to a vertical wall, or other firm support. The cylinder 5, in which the dough is placed for producing macaroni, is rigidly attached to, and supported from, the front edge of the lower flange 2 of the bracket. For this purpose, it is constructed with an enlarged head $5^a$ having a lateral flange or lug $5^b$ which rests upon, and is bolted to, the bracket flange 2. The lower end of the cylinder 5 is provided with means for supporting and holding the die through which the dough is to be pressed to form macaroni.

It will be understood that dies of different patterns will be employed according to the particular product which is to be manufactured; also, plates having different forms of perforations suitable for use when it is desired to compress fruit or the like. A piston or plunger is adapted to slide in the cylinder 5 and is attached to a screw-shaft 6 to whose upper end is keyed a miter gear 7. The upper end of the shaft 6 is journaled in the upper and lower parallel arms 8, $8^a$, of a bracket which is secured to a triangular plate 9 that slides on the three guide rods 4. The aforesaid bracket has vertical end flanges or lugs $8^b$ in which a horizontal shaft 10 is journaled, the same having a bevel pinion 11 that meshes with the gear 7 and serves to drive the same. On the front end of the shaft 10, a hand-wheel or other driver is, in practice, mounted, and, by rotating the same in one direction or the other, it is obvious that the screw-shaft 6 will be correspondingly rotated. The said shaft works in a nut 12 which, as shown best in Fig. 5, is constructed of two parts, or jaws, that are hinged together at 13, and adapted to be clamped on the screw-shaft 6, by means of a device 14, consisting of a screw hinged to one of the jaws of the nut and having on its free end a butterfly nut 15, beneath which is arranged a spiral spring 16, for supporting a washer arranged beneath the nut. The nut 12 is arranged in the horizontal slot of a yoke, or crosshead 17, which is rigidly connected by arms 18 with the enlarged head $5^a$ of the cylinder 5. When the nut 12 is closed or clamped upon the screw-shaft 6, as shown in Figs. 1, 2, 3, upon rotating the screw-shaft to the right, the piston will be forced downward so as to expel the dough previously placed therein, and force it through the die plate at the bottom of the cylinder 5, so as to produce macaroni or other product. On the other hand, if the screw-shaft 6 be rotated in the opposite direction, the piston will be raised. In all cases, in order to place dough or other material in the cylinder 5, the piston is to be raised above it, so as to leave the mouth or upper end of the cylinder exposed. It will be seen that when the screw-shaft travels in the nut downward or upward, the plate 9 slides on the guide rods 4 correspondingly, and of necessity the bracket and gearing carried thereby move with it.

It has been usual and necessary in machines of this class, to rotate the screw so as to bring the piston above the cylinder, but by means of my improved construction and combination of parts, particularly by utilizing the two-part nut 12, I am enabled to do this with much greater celerity and with less labor. Thus, when the piston has been forced down to the required limit, and it is desired to raise it above the cylinder, the clamping device 14, 15, is released and swung out of engagement with one of the jaws of the nut 12, and the latter is opened as shown by dotted lines Fig. 5, so as to free it completely from the screw-shaft. Then the entire apparatus, comprising the piston, screw-shaft, driving gear, and the plate 9, which slides on the guide rods 4, may be lifted to the required height. This may be done manually, but hoisting means may be provided and is connected with the apparatus through the medium of a chain or rod secured to a loop 19 attached to the outer lug or arm 8ᵇ of the bracket 8. When the screw and the connected parts have been thus elevated to the required position, and the cylinder has been filled with dough or other material, the nut 12 is closed and clamped on the screw, when the machine is again ready for the pressing operation. For convenience in swinging open one of the jaws of the nut 12, it is provided with a hook 12ª; see Figs. 1, 3, 5.

It will be apparent from the foregoing description that I am able to effect an important economy in time and labor by means of the construction and combination of parts I have adopted. It is further apparent that, by means of the wall bracket 1, 2, 3, when braced by the guide rods 4, I form a very rigid and yet light and cheap support for the other portions of the machine. A special feature of the upper bracket 3 is its bifurcated form whereby space is provided for receiving the inner end of the bracket 8, 8ᵇ, when the piston and screw-shaft 6 are raised to the extreme height. It will be seen that without this bifurcation, it would be necessary to extend the body 1 of the wall bracket, and also the guide rods 4, to a considerably greater height in order to provide space for the bracket 8, 8ᵇ, which would increase the size, weight, and cost of the apparatus.

Figs. 6 and 7 illustrate a modification in which a wall bracket 1ª is provided with a short upper flange 3ª, in place of a bifurcated one as illustrated in Fig. 1. A bracket 8ᶜ, in which the gearing is arranged, is also constructed somewhat differently from the bracket before described, and the yoke 17ª is not provided with a two-part separable nut, and consequently the piston must be elevated solely by the operation of the screw 6ª.

What I claim is:

1. The improved machine for the purpose specified, comprising a wall bracket having a central or body portion and horizontal flanges at its ends, the upper flange being bifurcated as shown, rods rigidly connecting the two flanges, a cylinder attached to and pendent from the lower flange, a piston working in the cylinder, a screw-shaft connected therewith, gearing for rotating the screw-shaft, a bracket in which such gearing is mounted, a plate forming an attachment of the bracket and guided on the said rods, the inner end of the bracket being in vertical alinement with the bifurcation of the upper flange of the wall bracket, and a nut rigidly connected with the head of the cylinder and in which the screw-shaft is adapted to work, as shown and described.

2. The improved machine comprising a wall bracket and guide rods rigidly connecting its upper and lower portions, a cylinder rigidly attached to the bracket, a piston and screw-shaft, gearing operatively connected with the screw-shaft, and a bracket supporting the same held and guided on the aforesaid rods, a slotted yoke through which the screw-shaft passes, the same being rigidly connected with and supported above the lower flange of the bracket, a nut composed of two jaws pivoted together and within the yoke, a clamp-screw pivoted to one of the jaws and adapted to engage the free end of the other for securing the nut in operative relation with the screw-shaft but adapted to release the nut when it is desired to raise the piston, as shown and described.

JAMES RIVARA.

Witnesses:
S. D. BAKER,
LAMAR LAMBERT.